(12) United States Patent
Robinson

(10) Patent No.: US 11,627,732 B1
(45) Date of Patent: Apr. 18, 2023

(54) VIBRATING FISHING LURE

(71) Applicant: Karl M. Robinson, Glendale, AZ (US)

(72) Inventor: Karl M. Robinson, Glendale, AZ (US)

( * ) Notice: Subject to any disclaimer, the term of this patent is extended or adjusted under 35 U.S.C. 154(b) by 0 days.

(21) Appl. No.: 17/950,235

(22) Filed: Sep. 22, 2022

(51) Int. Cl.
*A01K 85/01* (2006.01)

(52) U.S. Cl.
CPC .................................. *A01K 85/01* (2013.01)

(58) Field of Classification Search
CPC .............................. A01K 85/01; A01K 85/017
USPC ............................................................. 43/42
See application file for complete search history.

(56) References Cited

U.S. PATENT DOCUMENTS

| | | | | |
|---|---|---|---|---|
| 5,436,622 A * | 7/1995 | Gutman | .................. | G08B 6/00 340/407.1 |
| 5,801,466 A * | 9/1998 | Odagiri | .................. | G08B 6/00 340/407.1 |
| 5,883,858 A * | 3/1999 | Holt | ...................... | A01K 79/02 367/139 |
| 6,684,556 B1 * | 2/2004 | Arbuckle | ............... | A01K 85/01 43/42.31 |
| 7,062,878 B1 * | 6/2006 | Williams, Jr. | ......... | A01K 85/01 43/42.31 |
| 8,950,105 B2 * | 2/2015 | Thomas | ................. | A01K 85/01 43/42.31 |
| 9,609,856 B1 * | 4/2017 | Little | .................... | A01K 87/00 |
| 2013/0067792 A1 * | 3/2013 | Thomas | ................. | A01K 85/01 43/42.31 |
| 2013/0227874 A1 * | 9/2013 | Dugan | ................... | A01K 85/01 43/26.2 |
| 2015/0150226 A1 * | 6/2015 | McLeod | ............... | A01K 85/16 43/42.06 |
| 2015/0264902 A1 * | 9/2015 | Scharle | ................. | A01K 85/01 43/42.31 |
| 2015/0264904 A1 * | 9/2015 | Castaneda | ............. | A01K 97/00 43/17.1 |
| 2017/0196209 A1 * | 7/2017 | Papagno | ................ | A01K 85/00 |
| 2020/0060250 A1 * | 2/2020 | Russell | ................ | A01K 87/007 |
| 2020/0352148 A1 * | 11/2020 | Mancini | ................ | A01K 85/01 |

FOREIGN PATENT DOCUMENTS

| | | | | | |
|---|---|---|---|---|---|
| DE | 202020101329 U1 | * | 7/2021 | | |
| JP | 2015530085 A | * | 1/1958 | | |
| JP | 2007312640 A | * | 12/2007 | | |
| JP | 2015530085 A | * | 6/2018 | | |
| KR | 20120028788 A | * | 1/2016 | | |
| KR | 20120028788 A | * | 11/2016 | | |
| WO | WO-2011119972 A1 | * | 9/2011 | ............ | A01K 85/01 |
| WO | WO-2019082921 A1 | * | 5/2019 | ............ | A01K 85/00 |

* cited by examiner

*Primary Examiner* — Christopher P Ellis
(74) *Attorney, Agent, or Firm* — Bruce A. Lev

(57) ABSTRACT

A vibrating fishing lure including a vibrating mechanism adapted to be removably inserted within the body of the fishing lure. The vibrating mechanism is adapted to vibrate at chosen frequencies, patterns, and intensities depending on the water conditions present when in use and the type of fish desired to be caught. The vibrating mechanism can be controlled manually or by a remote control device which may incorporate computer applications thereon. The vibrating fishing lure and the remote control device may be used in conjunction with a fishing rod.

10 Claims, 5 Drawing Sheets

VIBRATING FISHING LURE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to fishing lures, and more specifically to articulating fishing lures.

2. Description of the Related Art

Prior art fishing lures come in many shapes, sizes, and colors with many types of hooks and attachments connected thereto. Many are formed with articulating parts imitating movements of a fish. In many cases however, when in use, the fish are uninterested in the lure, which makes catching the fish much more difficult. Therefore, a need exists for advancements in the technology to increase the effectiveness of fishing lures. Accordingly, the present invention overcomes the disadvantages associated with the prior art by providing a vibrating fishing lure including a vibrating mechanism adapted to vibrate at different frequencies, patterns, and intensities depending on the water conditions present when in use and the type of fish desired to be caught, to imitate the types of food the fish desire and would bite upon.

BRIEF SUMMARY OF THE INVENTION

In view of the foregoing disadvantages inherent in the known types of fishing lures or the like in the prior art, the present invention provides a vibrating fishing lure. As such, the general purpose of the present invention, which will be described subsequently in greater detail, is to provide a vibrating fishing lure including a vibrating mechanism adapted to be removably inserted within the body of the fishing lure. The vibrating mechanism being adapted to vibrate at chosen frequencies, patterns, and intensities depending on the water conditions present when in use and the type of fish desired to be caught. The vibrating mechanism can be controlled manually or by a remote control device which may incorporate computer applications thereon.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

Figure 1:
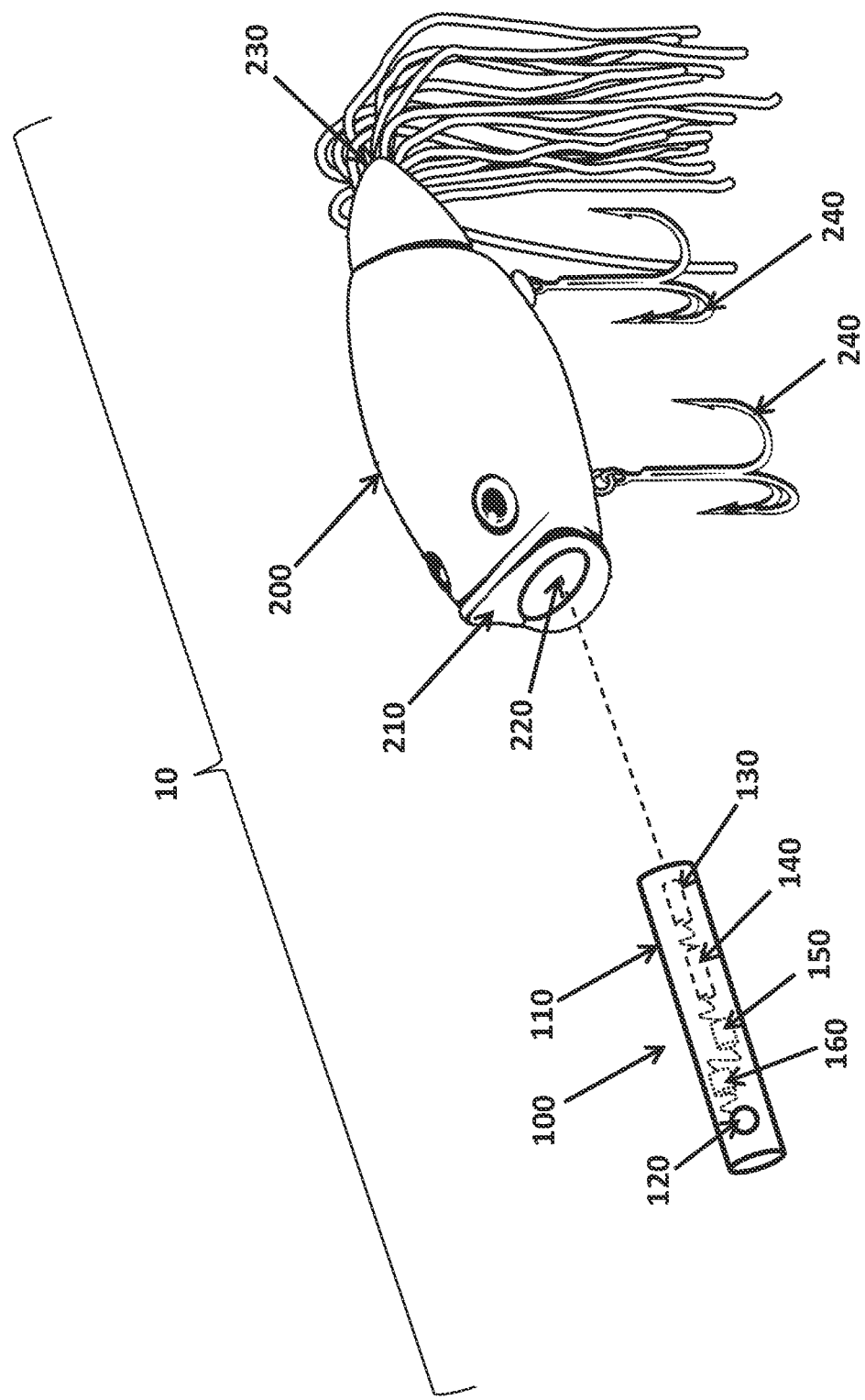
FIG. 1 shows an exploded view of the vibrating fishing lure with the vibrating mechanism about to be inserted within the fishing lure body according to the preferred embodiment of the present invention.
Figure 2:
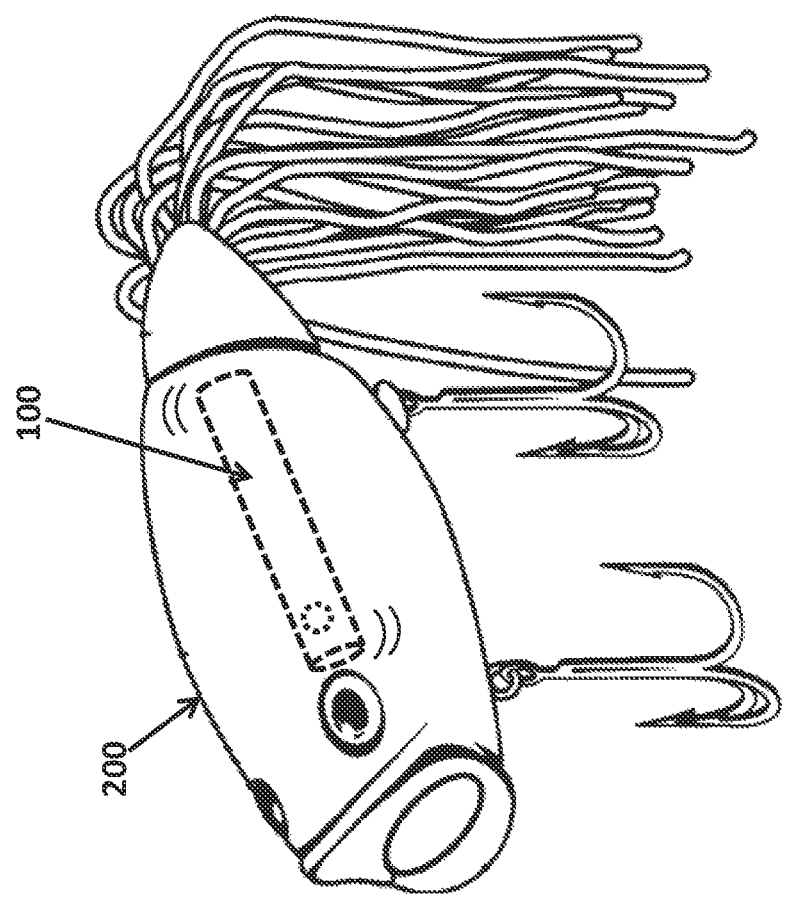
FIG. 2 shows a perspective view of the vibrating fishing lure according to the preferred embodiment of the present invention of FIG. 1.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

The instant invention is drawn to a vibrating fishing lure 10 including a vibrating mechanism 100 adapted to be removably inserted within the body of the fishing lure 200. The vibrating mechanism 100 being adapted to vibrate at chosen frequencies, patterns, and intensities depending on the water conditions present when in use and the type of fish desired to be caught. The vibrating mechanism 100 can be controlled manually or by a remote control device 30 which may incorporate computer applications thereon.

Turning now descriptively to FIGS. 1-5, the present invention discloses a vibrating fishing lure 10 comprising a main body 110 including a front end 210 having an opening 220 therethrough, a back end 230, an interior volume, and at least one hook 240 attached to an outside surface of the main body and is adapted to releasably hook a fish thereon; and a vibrator 100 including a casing 110 formed having an interior volume, a vibrating mechanism 140 located within the casing that is adapted to vibrate at a plurality of frequencies, patterns, and intensities, a power source 130 located within said casing and is adapted to provide power to the vibrating mechanism, and a control button 120 located upon an outer surface of the casing and is adapted to control the vibrating mechanism 100, wherein the vibrator is adapted to be removably inserted within the main body and vibrate at frequencies, patterns, and intensities chosen by a user. In an alternate embodiment, the vibrator 140 may be attached to an outside surface of the main body 110. Attachment means can include a clip between the main body 110 and the vibrator 100, or wires, or any other known releasable attachment means.

The vibrator 140 may further include a transceiver 160 located within the casing that is adapted to send and receive electronic signals to and from a remote control, and wherein the transceiver is adapted to be powered by the power source; and a computer 150 located within the casing that is adapted to further control the vibrating mechanism, and send and receive electronic signals to and from the transceiver, and wherein the computer is adapted to be powered by the power source.

The main body 110 of the vibrating fishing lure may be formed in the shape of a fish, or a fly, or any other types and shapes of luring devices, and have a plurality of hooks 240 attached to an outside surface of the main body and spaced from one another.

Figure 3:
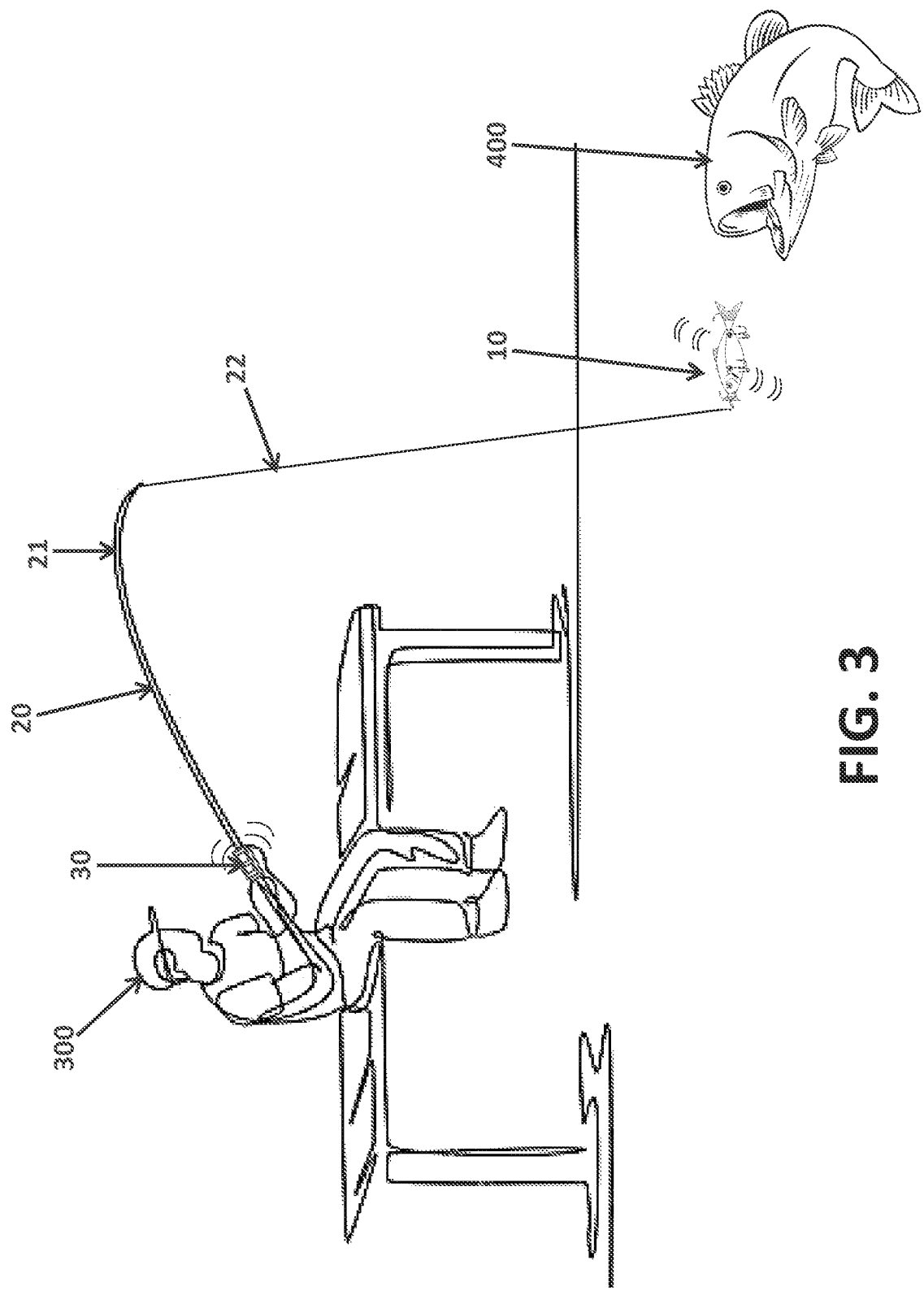
FIG. 3 shows the vibrating fishing lure and a remote control in-use upon a fishing line according to the preferred embodiment of the present invention of FIG. 1.
Figure 5:
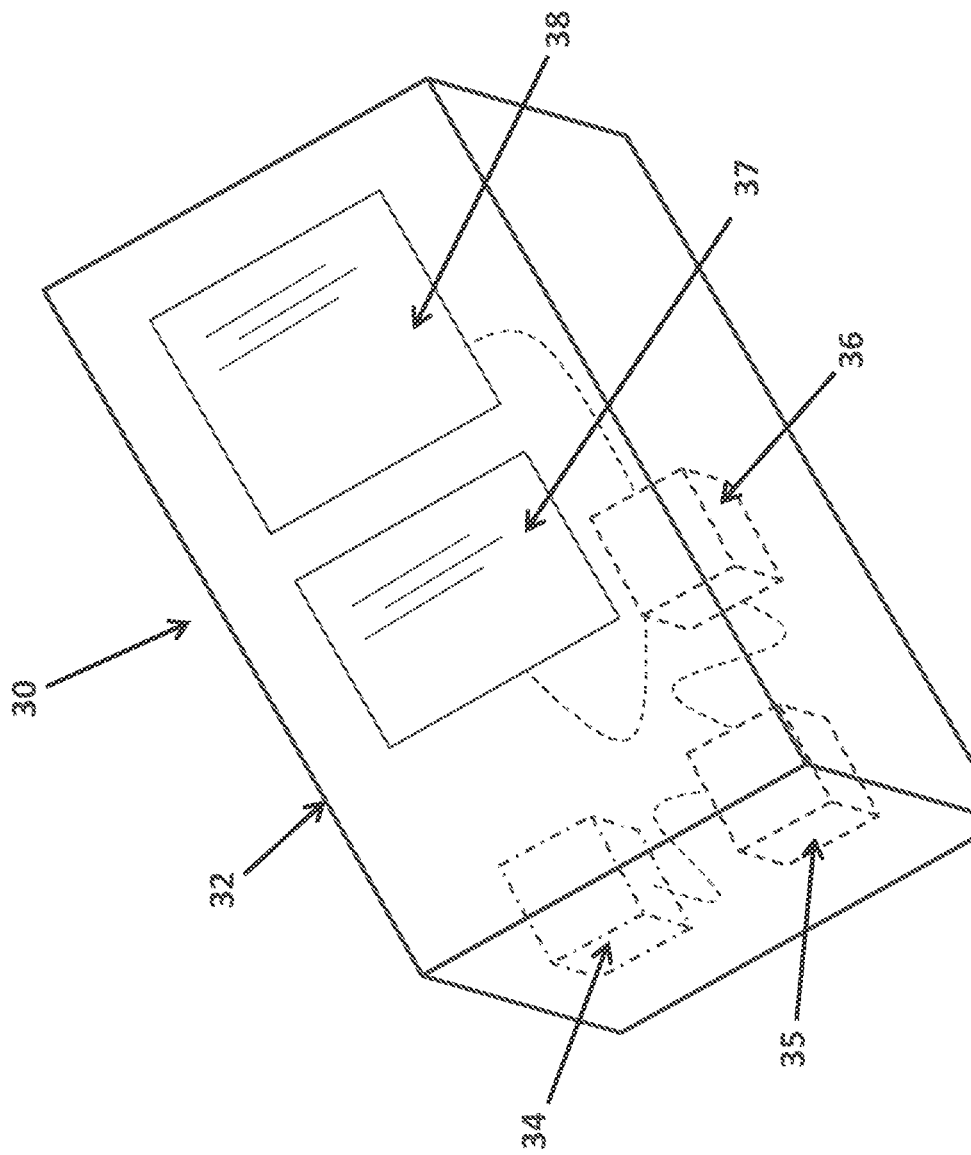
FIG. 5 shows a perspective view of the remote control according to the preferred embodiment of the present invention of FIG. 1.

As shown in FIGS. 3 and 5, a remote control 30 can be incorporated as well and attached to a fishing rod 20, wherein the remote control includes a housing 32; a power source 34 located within the housing; a transceiver 36 located within the housing, is connected to the power source, and is adapted to send and receive electronic signals; and a computer 35 located within the housing and is connected to the power source and the transceiver; a control panel 37 located upon an outside surface of the housing and is connected to the power source, the transceiver, and the computer; and a display panel 38 located upon an outside surface of the housing and is connected to the power source, the transceiver, and the computer, wherein the remote control is adapted to remotely control the vibrating fishing lure.

Figure 4:
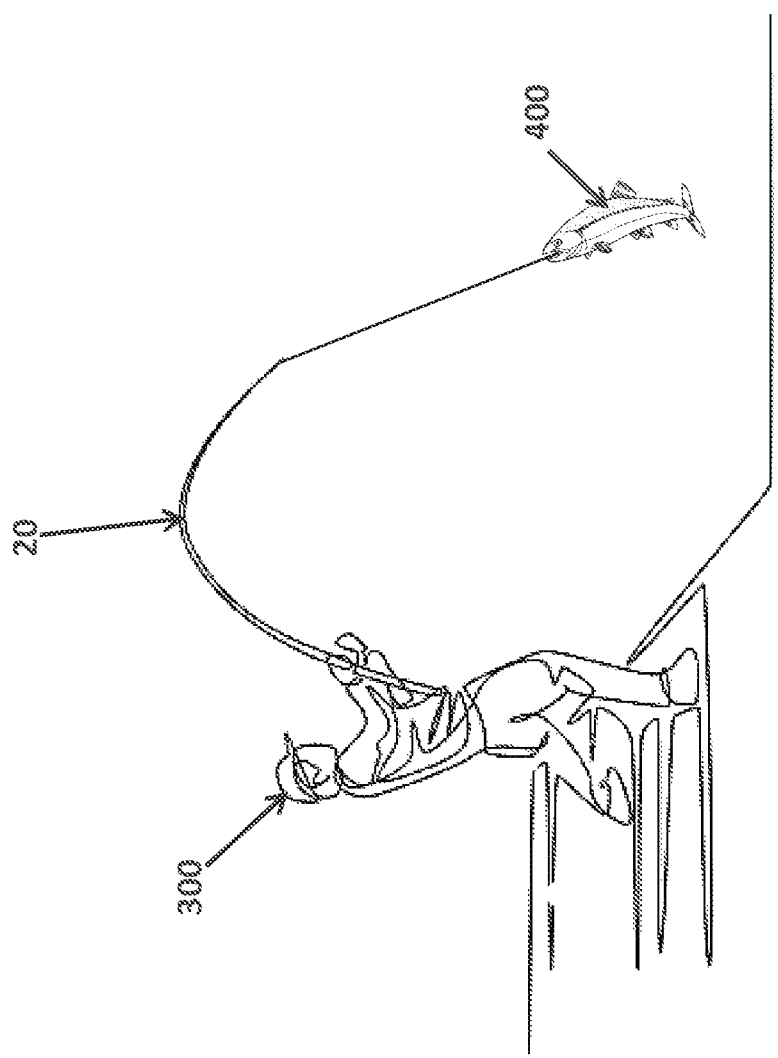
FIG. 4 shows a fish caught upon the vibrating fishing lure according to the preferred embodiment of the present invention of FIG. 1.

As shown in FIG. 3, the remote control 30 may also be installed upon a fishing rod 20 wherein the fishing rod includes an elongated rod section 21 and fishing line 22 connected to the elongated rod section, wherein a distal end portion of the fishing line is adapted to be attached to the vibrating fishing lure 10. In use, a fisherman 300 lures a fish 400 using the fishing lure 10. When the fish 400 tries to eat the vibrating fishing lure 10 it becomes hooked by the at least one hook 240, as shown in FIG. 4.

The main body 110 of the vibrating fishing lure may be formed from different types of materials depending on the specific gravity desired for the lure, and as such, can float at different levels within the body of water the fisherman is located at. The materials may include, stainless steel, copper, plastics, fiberglass, balsa wood, ceramics, etc. The interior of the lure may also include other materials as well, including Styrofoam, wood, or plastics, etc. The vibrating mechanism 100 may vibrate in a plurality of frequencies, patterns, and intensities. During experimentation it has been noted that different types of fish react differently to frequencies, patterns, and intensities. As such, a database of frequencies, patterns, and intensities may be created and applied within a computer application encoded upon the computer 35 of the remote control 30, and thereby offer a fisherman the ability to change the frequencies, patterns, and intensities during use for the different types of fish present, or simply change frequencies, patterns, and intensities to see which frequency and/or pattern attracts the fish present. This ability increases the effectiveness of the vibrating fishing lure and the chances of success of the fisherman.

The size and shape of the vibrating mechanism 100 may vary depending on the fishing lure being used. The most common sizes include a cylindrical shape having a length of 3 to 5 inches and a diameter of ½ an inch. Some may be bullet-shaped. However, shapes and sizes can vary.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A vibrating fishing lure comprising:
   a main body including:
      a front end;
         wherein said front end includes an opening therethrough;
         wherein said opening is formed having a width and a height forming an oval shape sized and adapted to allow a vibrator to pass therethrough; and
         wherein said opening is sized and adapted to allow a user to grab said vibrator with their fingers while inserting and removing from an interior volume of said main body;
      a back end;
      said interior volume; and
      at least one hook;
         wherein said at least one hook is attached to an outside surface of said main body and is adapted to releasably hook a fish thereon; and
   said vibrator including:
      a casing:
         wherein said casing forms an interior volume; and
         wherein said casing is formed having a width and a height smaller than said width and height of said opening of said front end of said main body;
      a vibrating mechanism;
         wherein said vibrating mechanism is located within said casing and is adapted to vibrate at a plurality of frequencies, patterns, and intensities;
      a power source;
         wherein said power source is located within said casing and is adapted to provide power to said vibrating mechanism; and
      a control button;
         wherein said control button is located upon an outer surface of said casing and is adapted to control said vibrating mechanism;
   wherein said vibrator is adapted to be removably inserted through said opening in said front end and into said main body and vibrate at frequencies, patterns, and intensities chosen by a user.

2. The vibrating fishing lure of claim 1, wherein said vibrator further includes:
   a transceiver;

wherein said transceiver is located within said casing and is adapted to send and receive electronic signals to and from a remote control; and
wherein said transceiver is adapted to be powered by said power source; and
a computer;
wherein said computer is located within said casing and is adapted to further control said vibrating mechanism, and send and receive electronic signals to and from said transceiver; and
wherein said computer is adapted to be powered by said power source.

3. The vibrating fishing lure of claim 1, wherein said main body is formed in the shape of a fish.

4. The vibrating fishing lure of claim 1, wherein there are a plurality of hooks attached to an outside surface of said main body and spaced from one another.

5. A combination of a remote control and a vibrating fishing lure, comprising:
a remote control including:
a housing;
a power source;
wherein said power source is located within said housing;
a transceiver;
wherein said transceiver is located within said housing, is connected to said power source, and is adapted to send and receive electronic signals; and
a computer;
wherein said computer is located within said housing and is connected to said power source and said transceiver;
a control panel;
wherein said control panel is located upon an outside surface of said housing and is connected to said power source, said transceiver, and said computer; and
a display panel;
wherein said display panel is located upon an outside surface of said housing and is connected to said power source, said transceiver, and said computer;
wherein said remote control is adapted to remotely control a vibrating fishing lure; and
said vibrating fishing lure comprising:
a main body including:
a front end;
wherein said front end includes an opening therethrough;
wherein said opening is formed having a width and a height forming an oval shape sized and adapted to allow a vibrator to pass therethrough; and
wherein said opening is sized and adapted to allow a user to grab said vibrator with their fingers while inserting and removing from an interior volume of said main body;
a back end;
said interior volume; and
at least one hook;
wherein said at least one hook is attached to an outside surface of said main body and is adapted to releasably hook a fish thereon; and
said vibrator including:
a casing;
wherein said casing forms an interior volume; and
wherein said casing is formed having a width and a height smaller than said width and height of said opening of said front end of said main body;
a vibrating mechanism;
wherein said vibrating mechanism is located within said casing and is adapted to vibrate at a plurality of frequencies, patterns, and intensities;
a power source;
wherein said power source is located within said casing and is adapted to provide power to said vibrating mechanism; and
a control button;
wherein said control button is located upon an outer surface of said casing and is adapted to control said vibrating mechanism;
wherein said vibrator is adapted to be removably inserted through said opening in said front end and into said main body and vibrate at frequencies, patterns, and intensities chosen by a user.

6. The combination of claim 5, wherein said main body is formed in the shape of a fish.

7. The combination of claim 5, wherein there are a plurality of hooks attached to an outside surface of said main body and spaced from one another.

8. A combination of a fishing rod, a remote control, and a vibrating fishing lure, comprising:
a fishing rod including:
an elongated rod section; and
a fishing line;
wherein said fishing line is connected to said elongated rod section; and
wherein a distal end portion of said fishing line is adapted to be attached to a vibrating fishing lure;
a remote control including:
a housing;
a power source;
wherein said power source is located within said housing;
a transceiver;
wherein said transceiver is located within said housing, is connected to said power source, and is adapted to send and receive electronic signals; and
a computer;
wherein said computer is located within said housing and is connected to said power source and said transceiver;
a control panel;
wherein said control panel is located upon an outside surface of said housing and is connected to said power source, said transceiver, and said computer; and
a display panel;
wherein said display panel is located upon an outside surface of said housing and is connected to said power source, said transceiver, and said computer;
wherein said remote control is adapted to remotely control a vibrating fishing lure; and
said vibrating fishing lure comprising:
a main body including:
a front end;
wherein said front end includes an opening therethrough;

wherein said opening is formed having a width and a height forming an oval shape sized and adapted to allow a vibrator to pass therethrough; and wherein said opening is sized and adapted to allow a user to grab said vibrator with their fingers while inserting and removing from an interior volume of said main body;

a back end;

said interior volume; and at least one hook;

wherein said at least one hook is attached to an outside surface of said main body and is adapted to releasably hook a fish thereon; and a said vibrator including:

a casing:

wherein said casing forms an interior volume; and wherein said casing is formed having a width and a height smaller than said width and height of said opening of said front end of said main body;

a vibrating mechanism;

wherein said vibrating mechanism is located within said casing and is adapted to vibrate at a plurality of frequencies, patterns, and intensities;

a power source;

wherein said power source is located within said casing and is adapted to provide power to said vibrating mechanism; and a control button;

wherein said control button is located upon an outer surface of said casing and is adapted to control said vibrating mechanism;

wherein said vibrator is adapted to be removably inserted through said opening in said front end and into said main body and vibrate at frequencies, patterns, and intensities chosen by a user.

9. The combination of claim 8, wherein said main body is formed in the shape of a fish.

10. The combination of claim 8, wherein there are a plurality of hooks attached to an outside surface of said main body and spaced from one another.

* * * * *